(12) United States Patent
Cheng

(10) Patent No.: US 10,917,506 B2
(45) Date of Patent: *Feb. 9, 2021

(54) TERMINAL DISPLAY ASSEMBLY AND MOBILE TERMINAL

(71) Applicant: GUANGDONG OPPO MOBILE TELECOMMUNICATIONS CORP., LTD., Guangdong (CN)

(72) Inventor: Jiao Cheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 149 days.

This patent is subject to a terminal disclaimer.

(21) Appl. No.: 16/174,963

(22) Filed: Oct. 30, 2018

(65) Prior Publication Data
US 2019/0245958 A1   Aug. 8, 2019

(30) Foreign Application Priority Data

Feb. 5, 2018  (CN) .......................... 2018 1 0113053
Feb. 5, 2018  (CN) ..................... 2018 2 0204218 U (51) Int. Cl.
*G06F 1/16* (2006.01)
*H04M 1/02* (2006.01)

(52) U.S. Cl.
CPC ........ *H04M 1/0266* (2013.01); *G06F 1/1626* (2013.01); *G06F 1/1637* (2013.01);
(Continued)

(58) Field of Classification Search
CPC . H04M 1/0266; H04M 1/0264; G06F 1/1626; G06F 1/1637; G06F 1/1656; G06F 1/1686; G06F 2200/1634
See application file for complete search history.

(56) References Cited

U.S. PATENT DOCUMENTS

2012/0105400 A1   5/2012  Mathew et al.
2013/0177302 A1*  7/2013  Weber ................... G06F 1/1626
                                                                 396/155
(Continued)

FOREIGN PATENT DOCUMENTS

CN    106506742 A    3/2017
CN    106936954 A    7/2017
(Continued)

OTHER PUBLICATIONS

International search report for Application No. PCT/CN2018/114861, dated Jan. 30, 2019 (10 pages).
(Continued)

*Primary Examiner* — Rockshana D Chowdhury
(74) *Attorney, Agent, or Firm* — Ladas & Parry LLP (57) ABSTRACT

The present disclosure provides a terminal display assembly and a mobile terminal. The terminal display assembly includes a display screen, a first light-transmissive cover plate, a light-shielding member and a second light-transmissive cover plate. The display screen defines a first through hole. The first light-transmissive cover plate is provided on the display screen, and defines a second through hole. The second through hole has a size larger than that of the first through hole to form a supporting surface on the display screen. The light-shielding member has a bottom wall and a side wall. The side wall forms a receiving space and is adjacent to the first light-transmissive cover plate. The bottom wall is provided on the supporting surface, and defines a third through hole. The second light-transmissive cover plate is provided within the receiving space to cover the first through hole and the third through hole.

20 Claims, 7 Drawing Sheets

(52) U.S. Cl.
 CPC .......... *G06F 1/1656* (2013.01); *G06F 1/1686* (2013.01); *H04M 1/0264* (2013.01); *G06F 2200/1634* (2013.01)

(56) References Cited

U.S. PATENT DOCUMENTS

| | | | |
|---|---|---|---|
| 2016/0011633 A1* | 1/2016 | Watanabe | G06F 1/1637 345/184 |
| 2016/0202515 A1 | 7/2016 | Watanabe et al. | |
| 2017/0069299 A1* | 3/2017 | Kwak | G06F 3/147 |
| 2017/0186891 A1* | 6/2017 | Min | H01L 27/3227 |
| 2019/0243417 A1* | 8/2019 | Cheng | H04M 1/0264 |

FOREIGN PATENT DOCUMENTS

| | | | |
|---|---|---|---|
| CN | 107068902 A | 8/2017 | |
| CN | 107229148 A | 10/2017 | |
| CN | 107241466 A | 10/2017 | |
| CN | 107277196 A | 10/2017 | |
| CN | 207853957 U | 9/2018 | |
| CN | 207853958 U | 9/2018 | |
| EP | 2448243 A2 | 5/2012 | |
| EP | 2667236 A1 | 11/2013 | |

OTHER PUBLICATIONS

European search report for Application No. EP18208294.1, dated Mar. 22, 2019(10pages).
Australian Examination Report, Australian Application No. 2018406326, dated Oct. 27, 2020 (4 pages).

* cited by examiner

TERMINAL DISPLAY ASSEMBLY AND MOBILE TERMINAL

CROSS-REFERENCE TO RELATED APPLICATIONS

This application claims priorities to Chinese Patent Application Nos. 201810113053.2 and 201820204218.2, all filed on Feb. 5, 2018, the contents of which are herein incorporated by reference in their entireties.

TECHNICAL FIELD

The present disclosure relates to the technical field of terminals, and particularly to a terminal display assembly and a mobile terminal.

BACKGROUND

With the development of communication technologies, mobile terminals, for example, smart phones, are getting increasingly popular, and have a wide range of applications, such as photographing, chatting and playing games. The mobile terminal has more and more functions and more and more internally mounted devices, especially more and more devices on a face of the mobile terminal where a screen is mounted. Under the circumstance that the size of the mobile terminal remains unchanged, display areas of the display screen tend to be sacrificed and reduced.

BRIEF DESCRIPTION OF THE DRAWINGS

In order to more clearly illustrate the technical solutions in the embodiments of the present disclosure, a brief introduction will be made below to the drawings required to be used in the description of the embodiments. Evidently, the drawings in the following description are only some embodiments of the present disclosure. Those skilled in the art can further obtain other drawings without any creative work according to these drawings.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present disclosure without creative efforts shall fall within the protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention. "a plurality of" means two or more than two, unless specified otherwise.

In the present disclosure, unless specified or limited otherwise, terms "mounted", "connected", "coupled" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

It should be understood that, the "communication terminal" (also referred to as "terminal") used herein includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), a digital television network such as a DVB-H network, a satellite network, an AM-FM broadcast transmitter, and/or another communication terminal. A communication terminal that is set to communicate over a wireless interface may be referred to as a "wireless communication terminal", "wireless terminal" and/or "mobile terminal". Examples of the mobile terminal include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

The embodiments of the present disclosure provide a terminal display assembly and a mobile terminal, which will be described below separately in details. The terminal display assembly may be provided in the mobile terminal. The mobile terminal can be a smart phone, a tablet PC, or the like.

Figure 1:
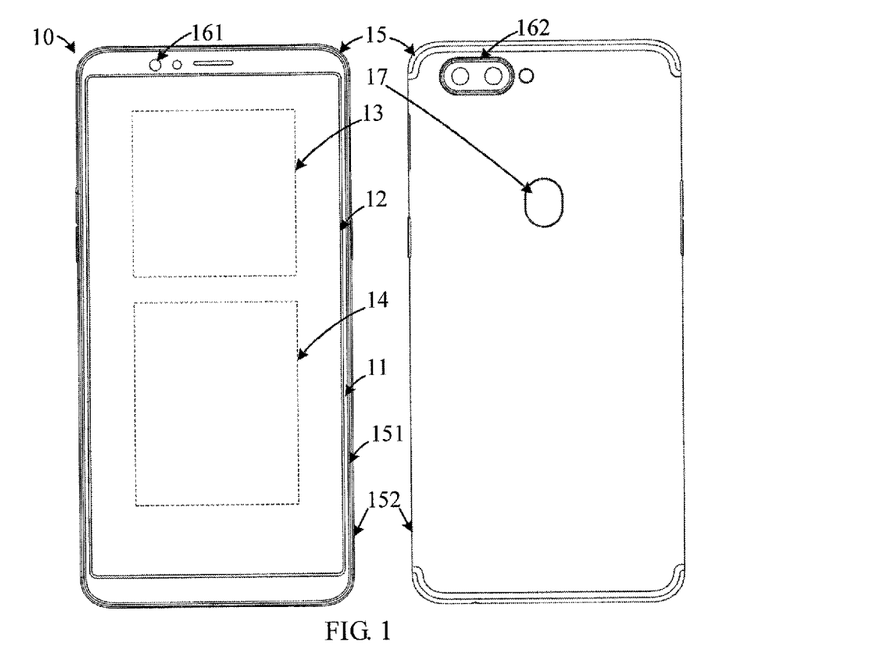
FIG. 1 is a structural diagram of a mobile terminal according to an embodiment of the present disclosure, which shows a front view and a back view of the mobile terminal.

Reference is now made to FIG. 1, which is a structural diagram of a mobile terminal according to an embodiment of the present disclosure. The mobile terminal 10 may include a cover plate 11, a display screen 12, a circuit board 13, a battery 14, a housing 15, a front camera 161, a rear camera 162, and a fingerprint unlocking module 17. It should be noted that the mobile terminal 10 is not limited to the above contents, and may further include other means, or may not include the rear camera 16, or may not include the fingerprint unlocking module 17.

The cover plate 11 is mounted onto the display screen 12 to cover the display screen 12. The cover plate 11 can be a transparent glass cover plate so that the display screen 12 displays through the light-transmissive cover plate 11. In some embodiments, the cover plate 11 can be a glass cover plate made of a material, for example, sapphire.

The housing 15 can form an outer contour of the mobile terminal 10. In some embodiments, the housing 15 may include a middle frame 151 and a rear cover 152. The middle frame 151 and the rear cover 152 are combined with each other to form the housing 15. The middle frame 151 and the rear cover 152 may form a receiving space for receiving the circuit board 13, the display screen 12, the battery 14 and the like. Further, the cover plate 11 can be fixed to the housing 15. The cover plate 11 and the housing 15 form a sealed space to accommodate the circuit board 13, the display screen 12, the battery 14 and the like. In some embodiments, the cover plate 11 is provided on and covers the middle frame 151; the rear cover 152 is provided on and covers the middle frame 151; the cover plate 11 and the rear cover 152 are located on opposite faces of the middle frame 151; and the cover plate 11 and the rear cover 152 are disposed to face each other.

In some embodiments, the housing 15 can be a metal housing, for example, magnesium alloy, stainless steel, or the like. It should be noted that the material of the housing 15 according to the embodiments of the present disclosure is not limited thereto, and may also adopt other manners. For example, the housing 15 can be a plastic housing. For another example, the housing 15 is a ceramic housing. For still another example, the housing 15 may include a plastic portion and a metal portion, and the housing 15 may have a housing structure where metal and plastic mate with each other. Specifically, the metal portion may be formed first, for example, a magnesium alloy substrate is formed by injection molding, and plastic is then injection-molded on the magnesium alloy substrate to form a plastic substrate. An integral housing structure is thus formed.

It should be noted that the structure of the housing according to the embodiments of the present disclosure is not limited thereto. For example, the rear cover and the middle frame may also be integrally shaped to form an integral housing 15 structure. The housing directly has a receiving space for receiving the circuit board 13, the display screen 12, the battery 14 and the like.

The circuit board 13 is mounted within the housing 15. The circuit board 13 can be a mainboard of the mobile terminal 10. The circuit board 13 can be integrated with one, two, or more of functional components including a motor, a microphone, a speaker, an earphone interface, a universal serial bus interface, the front camera 161, the rear camera 162, a distance sensor, an ambient light sensor, a receiver, and a processor.

In some embodiments, the circuit board 13 can be fixed within the housing 15. Specifically, the circuit board 13 can be screwed to the middle frame 151 by screws, or can be clamped onto the middle frame 151 by means of a buckle. It should be noted that a specific manner in which the circuit board 13 is fixed to the middle frame 151 in the embodiment of the present disclosure is not limited thereto, and may also adopt other manners, for example, a manner of fixing by means of both the buckle and the screws.

The battery 14 is mounted within the housing 15 and is electrically connected to the circuit board 13 to provide electrical power to the mobile terminal 10. The housing 15 can function as a battery cover of the battery 14. The housing 15 covers the battery 14 to protect the battery 14. In particular, the rear cover 152 covers the battery 14 to protect the battery 14, thereby reducing damage to the battery 14 due to collision and falling of the mobile terminal 10.

The display screen 12 is mounted within the housing 15. Meanwhile, the display screen 12 is electrically connected to the circuit board 13 to form a display surface of the mobile terminal 10. The display screen 12 can include a display area and a non-display area. The display area can be used to display pictures of the mobile terminal 10 or can be provided for a user to perform touch manipulation or the like. A top portion of the non-display area is provided with an opening for sound and light transmission, and a bottom portion of the non-display area can be provided with such functional components as a fingerprint module and a touch press-key. The cover plate 11 is mounted on the display screen 12 to cover the display screen 12. The same display area and non-display area as the display screen 12 may be formed, and different display areas and non-display areas may also be formed.

In some embodiments, the display screen 12 can be a liquid crystal display (LCD) or an organic light-emitting diode display (OLED). In some embodiments, when the display screen 12 is LCD, the display screen 12 may include a backlight module, a lower polarizer, an array substrate, a liquid crystal layer, a color film substrate, and an upper polarizer which are stacked sequentially. When the display screen 12 is OLED, the display screen 12 may include a base layer, an anode layer, an organic layer, an electrically conductive layer, an emission layer, and a cathode layer which are stacked sequentially. In some embodiments, the display screen 12 can be a transparent display screen, and can also be a non-transparent display screen.

It should be noted that the structure of the display screen 12 is not limited thereto. For example, the display screen 12 can be a special-shaped screen.

Figure 2:
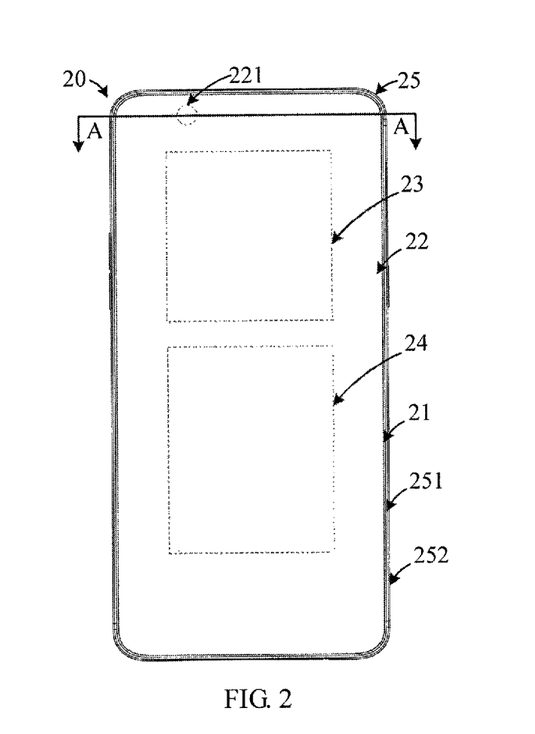
FIG. 2 is another structural diagram of a mobile terminal according to an embodiment of the present disclosure.

Reference is now made to FIG. 2, which is another structural diagram of a mobile terminal according to an embodiment of the present disclosure. The mobile terminal 20 includes a cover plate 21, a display screen 22, a circuit board 23, a battery 24, and a housing 25. The mobile terminal 20 differs from the mobile terminal 10 in that: the display screen 22 has a light-transmissive area directly formed thereon. For example, the display screen 22 is provided with a through hole 221 penetrating through the display screen 22 in a thickness direction. Optical devices such as a front camera, a headphone and a sensor can be provided at the position of the through hole 221 to facilitate signal transmission. The cover plate 21 can cover the position of the through hole 221, and can also be provided with a corresponding through hole.

Hereinafter, the light-transmissive area as a through hole 221 is exemplified for description.

Figure 3:
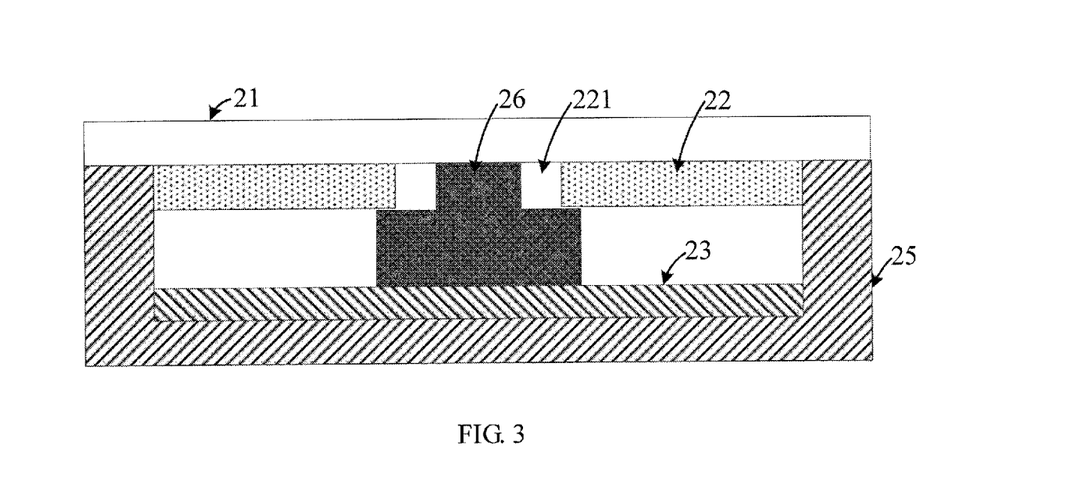
FIG. 3 is a cross-sectional view of the mobile terminal of FIG. 2 in an A-A direction.

Reference is now made to FIG. 3, which is a cross-sectional view of the mobile terminal of FIG. 2 in an A-A direction. The mobile terminal 20 can include an optical device mounted at one position of the through hole 221. The optical device is exemplified by a camera module 26. It should be noted that the optical device can also be integrated with such means as sensors. In some embodiments, the camera module 26 is exemplified by a camera. The camera module 26 can also be integrated with other optical device. The lens of the camera module 26 can be at least partially received within the through hole 221. The camera module 26 can be directly integrated on the circuit board 23, and can also be coupled thereto by a signal line. The circuit board 23 is mounted within the housing 25. The cover plate 21 is provided on and covers the display screen 22, and the cover plate 21 covers the through hole 221. The housing 25 may be referred to the above housing 15; the circuit board 23 may be referred to the above circuit board 13; and the battery 24 may be referred to the above battery 14. Details are not described herein.

In some embodiments, the through hole 221 may also be one, two or more. The through hole 221 can be adjacent to an edge of the display screen 22, for example, the through hole 221 is adjacent to an end of the display screen 22. The through hole 221 can also be adjacent to other locations of the display screen 22, such as adjacent to a side of the display screen 22, adjacent to a corner position of the display screen 22, or located at a middle position of the display screen 22. The through hole 221 may be a circular hole or a rectangular hole. The through hole 221 may also have other shapes, for example, an irregular hole.

As can be learned from above, the camera module 26 according to the embodiment of the present disclosure can realize photographing and video-recording through the through hole 221, without involving a need to additionally provide a camera on the mobile terminal. The display screen of the present disclosure covers a peripheral position of the housing 25; and as compared to providing a camera on the non-display area at the edge position of the display screen, the display area of the display screen is increased, with the size of the mobile terminal unchanged.

However, when the display screen 22 illuminates, light rays of the display screen 22 will be reflected or refracted into the through hole 221. The camera module 26 may result in interference during the photographing or video-recording process, affecting the imaging effect of the camera module 26 and thereby deteriorating imaging quality of the camera module 26.

Accordingly, the Applicant of the present disclosure has devised another mobile terminal to reduce or avoid interference with the camera module 26 caused by light rays from the display screen 22 when illuminating.

Figure 4:
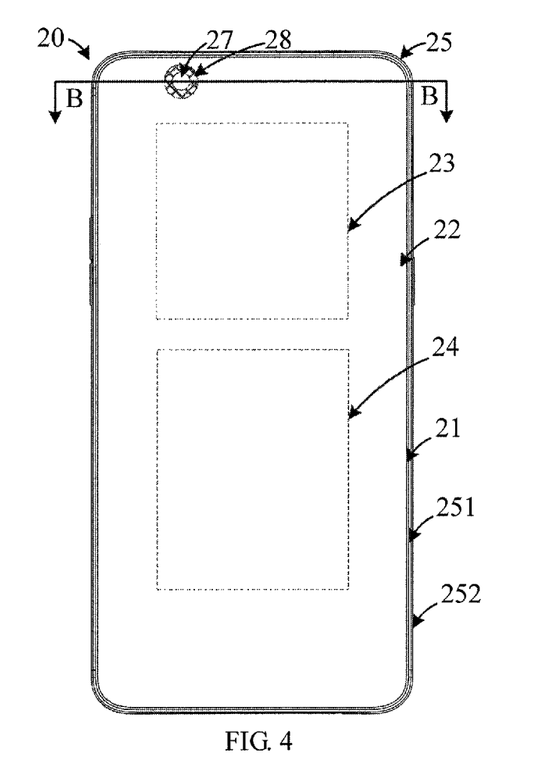
FIG. 4 is another structural diagram of a mobile terminal according to an embodiment of the present disclosure.
Figure 5:
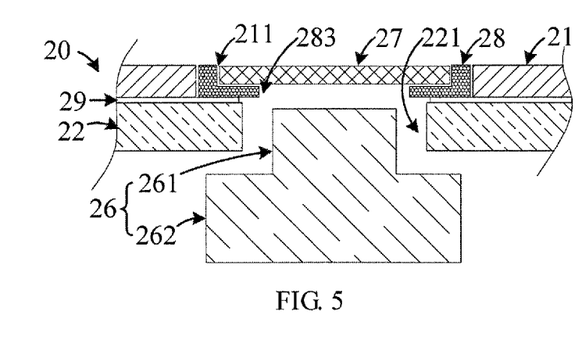
FIG. 5 is a cross-sectional view of the mobile terminal of FIG. 4 in a B-B direction.

Reference is now made to FIG. 4 which is another structural diagram of a mobile terminal according to an embodiment of the present disclosure and FIG. 5 which is a cross-sectional view of the mobile terminal of FIG. 4 in a B-B direction. The mobile terminal 20 may include a first light-transmissive cover plate 21, a second light-transmissive cover plate 27, a display screen 22, a circuit board 23, a battery 24, a housing 25, a light-shielding member 28, and an optical device. The display screen 22, the circuit board 23, the battery 24, and the housing 25 can be referred to the above contents, and details are not described herein.

The optical device is exemplified by a camera module 26 (referring to FIG. 5). The camera module 26 may include a base 262 and a lens 261 mounted on the base 262.

The first light-transmissive cover plate 21, the second light-transmissive cover plate 27, the display screen 22, and the light-shielding member 28 may form an assembly structure, for example, a terminal display assembly. In actual production and manufacture procedures, the display screen 22 may be first formed, and then the first light-transmissive cover plate 21, the second light-transmissive cover plate 27 and the light-shielding member 28 are respectively mounted on the display surface of the display screen 22 and are assembled to form a terminal display assembly. The terminal display assembly is exemplified below for detailed description.

Figure 6:
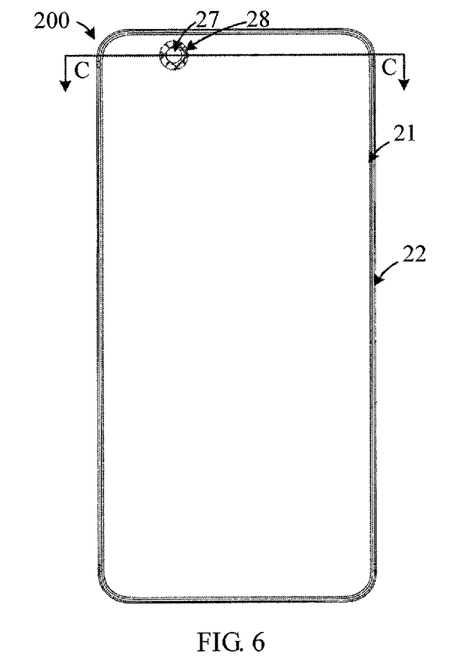
FIG. 6 is a structural diagram of a terminal display assembly according to an embodiment of the present disclosure.
Figure 7:
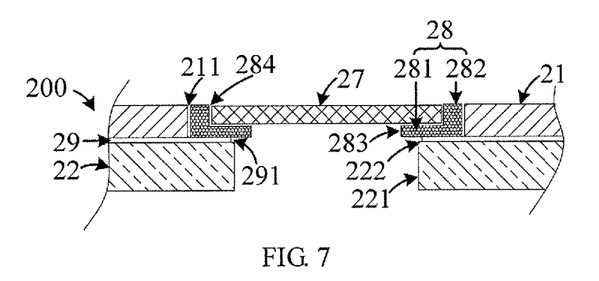
FIG. 7 is a cross-sectional view of the terminal display assembly of FIG. 6 in a C-C direction.

Reference is now made to FIG. 6 which is a structural diagram of a terminal display assembly according to an embodiment of the present disclosure and FIG. 7 which is a cross-sectional view of the terminal display assembly of FIG. 6 in a C-C direction. The terminal display assembly 200 may include a first light-transmissive cover plate 21, a second light-transmissive cover plate 27, a display screen 22, and a light-shielding member 28.

The display screen 22 defines a first through hole 221 penetrating through the display screen 22 in a thickness direction thereof. The first through hole 221 may be circular, rectangular or of other shape. Herein, the circular shape is exemplified for description. The first through hole 221 may be adjacent to the edge of the display screen 22, or may be located at other positions of the display screen 22. The first through hole 221 may also be one, two or more, and herein, one through hole is exemplified for description. The size of the first through hole 221 may be larger than that of the lens

261 of the camera module 26 as shown in FIG. 5. For example, the diameter of the first through hole 221 is larger than that of the lens 261. The lens 261 is at least partially received within the first through hole 221.

The first light-transmissive cover plate 21 is provided on and covers the display screen 22. The first light-transmissive cover plate 21 is a transparent cover plate, for example, a light-transmissive glass cover plate made of a light-transmissive glass material, or a light-transmissive sapphire cover plate made of a light-transmissive sapphire material. The first light-transmissive cover plate 21 defines a second through hole 211 penetrating through the first light-transmissive cover plate 21 in a thickness direction thereof. The second through hole 211 may be circular, rectangular or of other structure, and herein, the circular shape is exemplified for description. The number and position of the second through holes 211 are configured to correspond to those of the first through holes 221. The second through hole 211 is in communication with the first through hole 221, and overlaps with the first through hole 221 in a direction perpendicular to the display screen 22. The diameter of the second through hole 211 is larger than the diameter of the first through hole 221 to form a stepped surface 222 on the display screen 22.

It should be noted that the stepped surface 222 is formed on the display screen 22, and is parallel to a display surface of the display screen 22. Therefore, the stepped surface 222 is actually a supporting surface which is a portion of the display screen 22 exposed through the second through hole 211.

In some embodiments, the first light-transmissive cover plate 21 can be bonded to the display surface of the display screen 22 by an optical adhesive. The optical adhesive is molded to form an optically transparent adhesive layer 29 which is configured to be transparent. That is, the first light-transmissive cover plate 21 is bonded to the display screen 22 via the optically transparent adhesive layer 29. The optically transparent adhesive layer 29 defines a fourth through hole 291 which is formed at a position of the first through hole 221 and is in communication with the first through hole 221. The fourth through hole 291 overlaps with the first through hole 221 in a direction perpendicular to the display screen 22. The fourth through hole 291 can be circular, rectangular or of other shape, and herein, the circular shape is exemplified for description. The diameter of the fourth through hole 291 is greater than or equal to that of the first through hole 221. The optically transparent adhesive layer 29 may extend to at least a portion of the stepped surface 222. It should be noted that the optically transparent adhesive layer 29 may also not extend to the stepped surface 222.

The light-shielding member 28 is provided on the display screen 22. Specifically, the light-shielding member 28 is provided on the stepped surface 222. When the optically transparent adhesive layer 29 is provided on the stepped surface 222, the light-shielding member 28 is provided on the optically transparent adhesive layer 29. The light-shielding member 28 is made of a light-shielding material and has a light-shielding effect. For example, the light-shielding member 28 is made of a metal material such as stainless steel, aluminum alloy, magnesium alloy or the like. The light-shielding member 28 can also be made of light-shielding ink or other light-shielding material. The light-shielding ink can block visible light and ultraviolet light to form a light-shielding ink layer. The light-shielding ink layer can be black or silver white. The light-shielding ink layer can be formed on the second light-transmissive cover plate 27 by means of printing. Moreover, the light-shielding ink layer has a thin thickness and an excellent light-shielding effect.

In some embodiments, the light-shielding member 28 has a bottom wall 281 and a side wall 282 that forms a receiving space 284 around the bottom wall 281. The bottom wall 281 is provided on the optically transparent adhesive layer 29 at the upper portion of the stepped surface 222, and may define a third through hole 283 penetrating through the bottom wall 281 in a thickness direction thereof. The third through hole 283 is in communication with the first through hole 221, and overlaps with the first through hole 221 in a direction perpendicular to the display screen 22. The diameter of the third through hole 283 may be larger than, smaller than, or equal to that of the first through hole 221. Herein, that the diameter of the third through hole 283 is smaller than that of the first through hole 221 is exemplified for description, whereby a width of the bottom wall 281 in a direction parallel to the display screen 22 increases and may extend to above the first through hole 221, thereby achieving the effect of better blocking light rays refracted or reflected from the display screen 22.

The side wall 282 is adjacent to the first light-transmissive cover plate 21, and a free end of the side wall 282 can be flush with an outer surface of the first light-transmissive cover plate 21. It should be noted that the outer surface of the first light-transmissive cover plate 21 is a face away from the display screen 22. It should be further noted that the free end of the side wall 282 may also be lower than the outer surface of the first light-transmissive cover plate 21, that is, a sum of the height of the side wall 282 and the thickness of the bottom wall 281 is smaller than the thickness of the first light-transmissive cover plate 21. The outer surface of the first light-transmissive cover plate 21 may extend and form an extension to cover the side wall 282.

The second light-transmissive cover plate 27 is provided within the receiving space 284, is superimposed on the bottom wall 281, and covers the first through hole 221 and the third through hole 283. The second light-transmissive cover plate 27 can also cover the fourth through hole 291. The second light-transmissive cover plate 27 is configured to be light-transmissive, for example, configured to be a light-transmissive glass cover plate made of a light-transmissive glass material, or a light-transmissive sapphire cover plate made of a light-transmissive sapphire material. In some embodiments, an outer surface of the second light-transmissive cover plate 27 can be flush with the free end of the side wall 282, that is, the thickness of the second light-transmissive cover plate 27 is equal to the height of the side wall 282. It should be noted that the outer surface of the second light-transmissive cover plate 27 is a face away from the display screen 22. The thickness of the second light-transmissive cover plate 27 may also be greater than the height of the side wall 282. For example, the second light-transmissive cover plate 27 extends from a periphery of the outer surface thereof and beyond an extension which covers the side wall 282. The outer surface of the second light-transmissive cover plate 28 is flush with the outer surface of the first light-transmissive cover plate 21.

In some embodiments, a portion of the bottom wall 281 extends to above the first through hole 221, which not only can enhance the light-shielding effect, but also may increase the area of connection to the second light-transmissive cover plate 27, thereby achieving the effect of protecting the second light-transmissive cover plate 27.

As can be learned from above, the first through hole 221, the fourth through hole 291, the third through hole 283, and the second through hole 211 according to the embodiments of the present disclosure are in communication with each other, and overlap somewhat with each other in a direction perpendicular to the display screen 22 to form mutually communicated channels available for signals to pass through. Further, the first through hole 221, the fourth through hole 291, the third through hole 283, and the second through hole 211 according to the embodiments of the present disclosure may have the same central axis. Accordingly, in the embodiments of the present disclosure, when the display screen 22 illuminates, light rays refracted or reflected by the display screen 22 to the positions of the first through hole 221 and the second through hole 211 can be blocked by the bottom wall 281 and the side wall 282, respectively, and thus cannot enter the positions of the first through hole 221 and the second through hole 211. Thereby, it is possible to ensure that optimal means such as a camera, an ambient light sensor, a proximity sensor and the like, transmit signals via the first through hole 221 and the second through hole 211, thereby avoiding the light rays of the display screen 22 from interfering therewith.

According to the embodiment of the present disclosure, when the display screen 22 of the terminal display assembly 200 illuminates, light rays directed towards the direction of the second light-transmissive cover plate 27 in the light ray refraction and reflection procedures are blocked by the light-shielding member. Then, the light rays of the display screen 22 will not enter the second light-transmissive cover plate 27, and thus will not affect the effect of transmitting, by the optical device, signals to the outside via the first through hole 221. It should be noted that the structure of the terminal display assembly 200 is not limited thereto.

Figure 8:
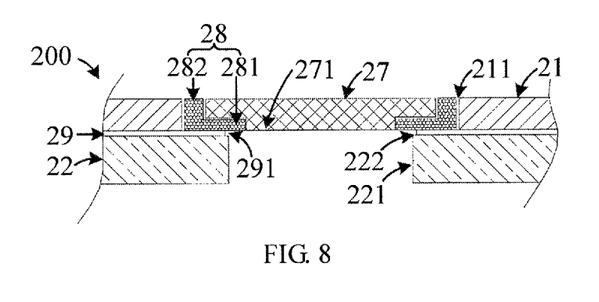
FIG. 8 is another cross-sectional view of the terminal display assembly of FIG. 6 in the C-C direction.

Reference is now made to FIG. 8, which is another cross-sectional view of the terminal display assembly of FIG. 6 in the C-C direction. The terminal display assembly 200 shown in FIG. 8 differs from that of FIG. 7 in that: the second light-transmissive cover plate 27 has a projection 271 extending in a direction of an inner surface thereof, where the projection 271 is formed in manner of extending toward the display screen 22. The surface of the projection 271 can be flush with the surface of the bottom wall 281. The periphery of the projection 271 can be connected to the bottom wall 281. Thereby, it is possible to improve strength of the second light-transmissive cover plate 27 and strength of connection between the second light-transmissive cover plate 27 and the light-shielding member 28.

Therefore, the above embodiment of the present disclosure achieves a light-shielding effect in two different directions via the bottom wall 281 and the side wall 282 of the light-shielding member 28. It should be noted that the structure of the light-shielding member 28 is not limited thereto.

Figure 9:
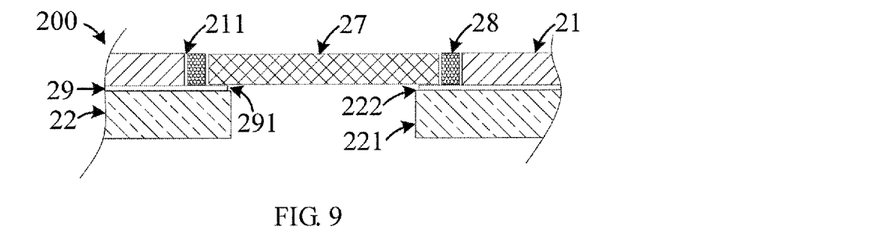
FIG. 9 is another cross-sectional view of the terminal display assembly of FIG. 6 in the C-C direction.

Reference is now made to FIG. 9 which is another cross-sectional view of the terminal display assembly of FIG. 6 in the C-C direction. The terminal display assembly 200 shown in FIG. 9 differs from that of FIG. 7 in that: the second light-transmissive cover plate 27 is directly provided on the optically transparent adhesive layer 29 provided on the stepped surface 222 to cover the first through hole 221, and the light-shielding member 28 is directly provided on the optically transparent adhesive layer 29 provided on the stepped surface 222. The light-shielding member 28 and the second light-transmissive cover plate 27 are arranged side by side. The light-shielding member 28 is provided at a periphery of the second light-transmissive cover plate 27, and is located between the first light-transmissive cover plate 21 and the second light-transmissive cover plate 27.

The light blocking member 28 can also block light rays of the display screen 22 to reduce impact of the light rays of the illuminating display 22 on the optical device.

Figure 10:
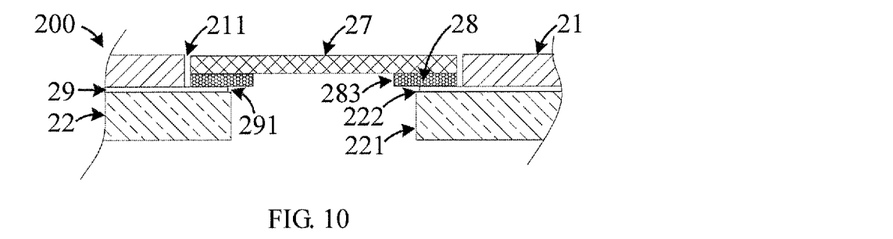
FIG. 10 is another cross-sectional view of the terminal display assembly of FIG. 6 in the C-C direction.

Reference is now made to FIG. 10, which is another cross-sectional view of the terminal display assembly of FIG. 6 in the C-C direction. The terminal display assembly 200 shown in FIG. 10 differs from that of FIG. 7 in that: the light-shielding member 28 is directly provided on the stepped surface 222, rather than on the periphery of the second light-transmissive cover plate 27; the second light-transmissive cover plate 27 is directly provided on the light-shielding member 28; and the second light-transmissive cover plate 27 and the light-shielding member 28 are configured in a stacked manner. The light-shielding member 28 can also block light rays of the display screen 22 to reduce impact of the light rays of the illuminating display screen 22 on the optical device.

Figure 11:
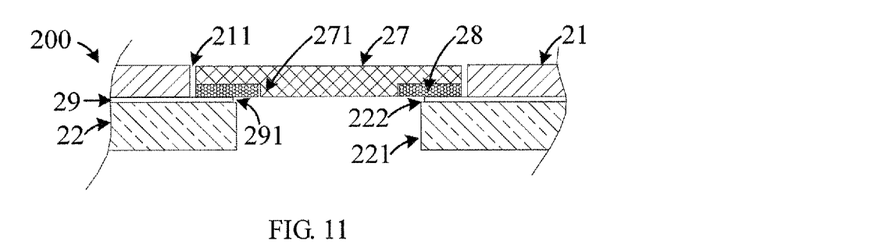
FIG. 11 is another cross-sectional view of the terminal display assembly of FIG. 6 in the C-C direction.

Reference is now made to FIG. 11, which is another cross-sectional view of the terminal display assembly of FIG. 6 in the C-C direction. The terminal display assembly 200 shown in FIG. 11 differs from that of FIG. 10 in that: the second light-transmissive cover plate 27 has a projection 271 extending from the inner surface thereof, where the projection 271 can be referred to the projection shown in FIG. 8 and details are not described herein.

As can be learned from above, in the embodiment of the present disclosure, when the terminal display assembly 200 is mounted onto the housing 25 of the mobile terminal 20, the camera module 26 or other optical device can be mounted at the position of the first through hole 221 of the display screen 22, or the lens 261 of the camera module 26 is directly mounted within the first through hole 221. It is possible to not only reduce space occupied by optical devices such as the camera module 26, but also block light rays refracted or reflected by the display screen 22 via the light-shielding member 28 to reduce or avoid interference with optical devices such as the camera module 26 caused by the light rays generated by the display screen 22.

Figure 12:
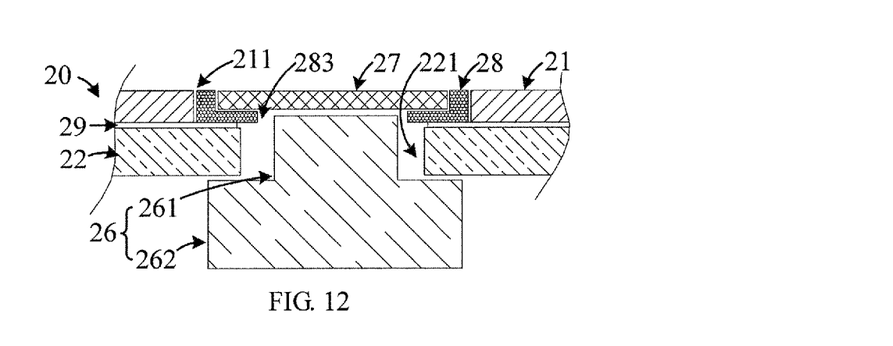
FIG. 12 is another cross-sectional view of the mobile terminal of FIG. 4 in the B-B direction.

It should be noted that the optical device, for example, the lens 261 of the camera module 26, can be received not only within the first through hole 221 but also within the third through hole 283. Reference is now made to FIG. 12, which is another cross-sectional view of the mobile terminal of FIG. 4 in the B-B direction. The lens 261 of the camera module 26 is received within the first through hole 221 and the third through hole 283.

It should be noted that the structure of the display screen is not limited thereto. For example, the display screen 22 is provided with a non-display area, and the light-transmissive area may include the non-display area.

Figure 13:
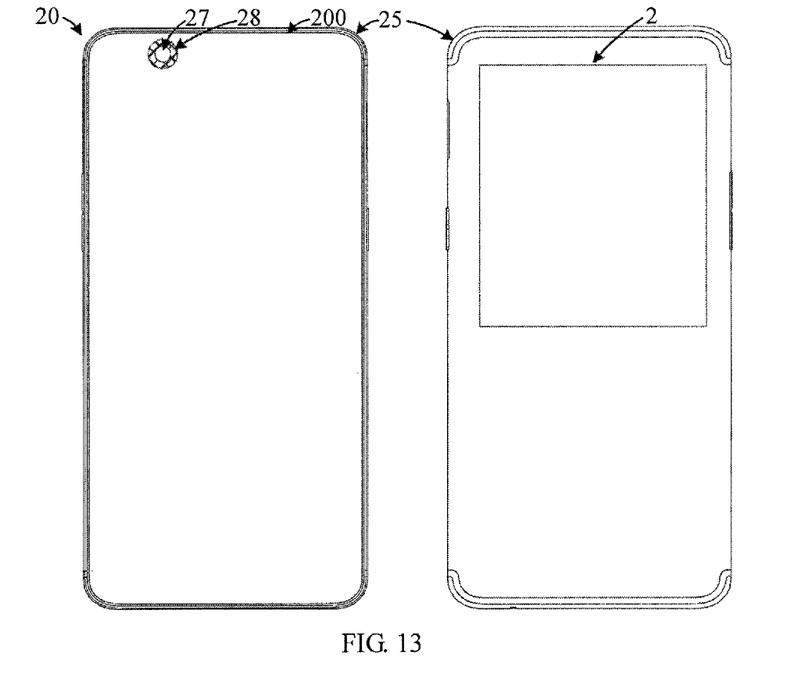
FIG. 13 is another structural diagram of a mobile terminal according to an embodiment of the present disclosure, which shows a front view and a back view of the mobile terminal.

Reference is now made to FIG. 13, which is another structural diagram of a mobile terminal according to an embodiment of the present disclosure. The mobile terminal 20 of FIG. 13 differs from the mobile terminal described above in that: the mobile terminal 20 includes a primary terminal display assembly 200 and a secondary terminal display assembly 2, wherein the primary terminal display assembly 200 is mounted on one face of the housing 25 and the secondary terminal display assembly 2 is mounted on the other face of the housing 25; i.e., the primary terminal display assembly 200 and the secondary terminal display assembly 2 are provided on opposite faces of the housing 25, respectively. In some embodiments, the display area in the primary terminal display assembly 200 is larger than that in the secondary terminal display assembly 2. In some embodiments, the primary terminal display assembly 200 can be referred to the above terminal display assembly 200, and details are not described herein. The secondary terminal display assembly 2 may include a display screen and a cover plate, wherein the display screen and the cover plate can be referred to the above contents.

Figure 14:
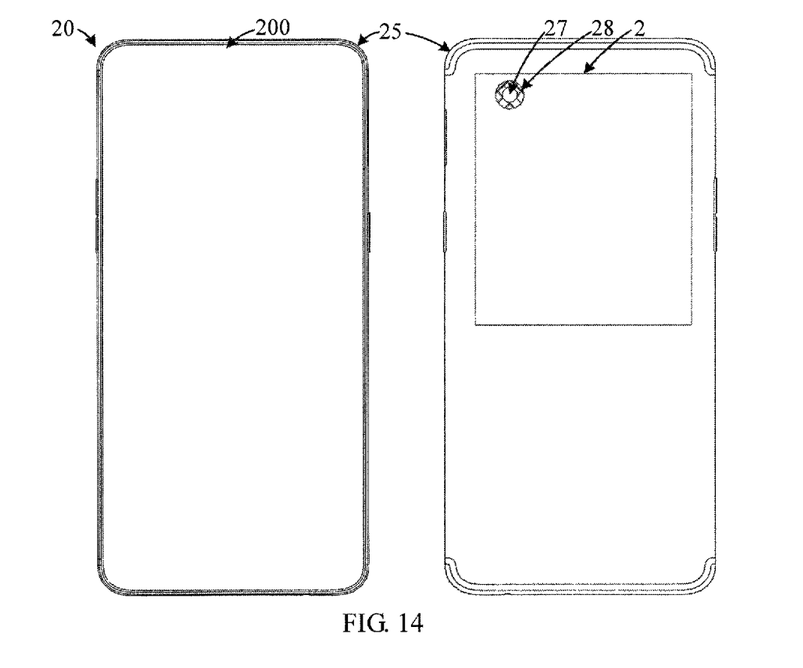
FIG. 14 is another structural diagram of a mobile terminal according to an embodiment of the present disclosure, which shows a front view and a back view of the mobile terminal.

It should be noted that the secondary terminal display assembly 2 may also include two cover plates and a light-shielding member. Specifically, reference is made to FIG. 14, which is another structural diagram of a mobile terminal according to an embodiment of the present disclosure. The mobile terminal 200 shown in FIG. 14 differs from that of FIG. 13 in that: the primary terminal display assembly 200 includes a display screen and a cover plate, but does not include a light-shielding member; and the secondary terminal display assembly 2 may include two cover plates, a display screen, and a light-shielding member. The structure of the secondary terminal display assembly 2 can be referred to the above contents, and details are not described herein.

Figure 15:
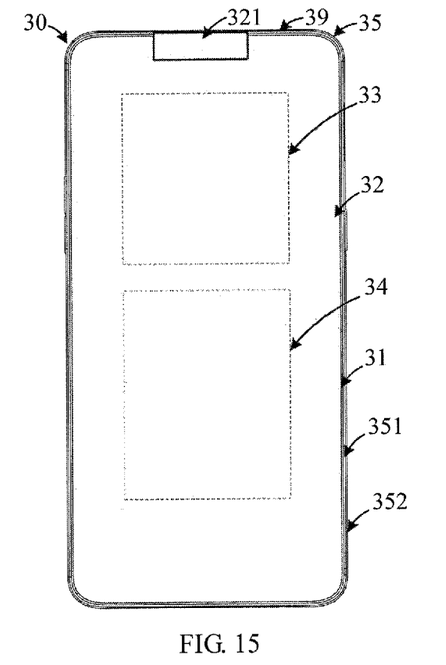
FIG. 15 is another structural diagram of a mobile terminal according to an embodiment of the present disclosure.

Reference is now made to FIG. 15, which is another structural diagram of a mobile terminal according to an embodiment of the present disclosure. The mobile terminal in FIG. 15 differs from that of FIG. 1 in that: the mobile terminal 30 in FIG. 15 includes a display screen 32, a cover plate 31, a circuit board 33, a battery 34, and a housing 35. The display screen 32 is provided at a periphery thereof with a notch 321 in which optical devices such as a front camera, a headphone and a sensor can be placed. The cover plate 31 is configured to be adapted to the structure of the display screen 32. The cover plate 31 can be provided with an equally sized notch in the notch 321. The cover plate 31 can also cover the position of the notch 321. It should be noted that: the housing 35 can be referred to the above housing 15; the circuit board 33 can be referred to the above circuit board 13, and the battery 34 can be referred to the above battery 14, which will not be described herein.

Figure 16:
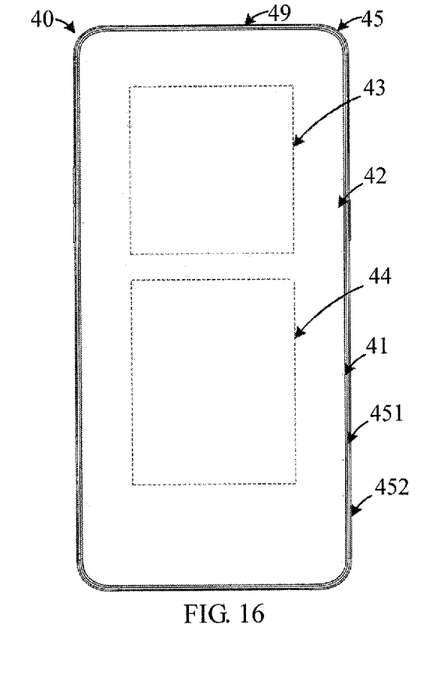
FIG. 16 is another structural diagram of a mobile terminal according to an embodiment of the present disclosure.

It should be further noted that, in some embodiments, the display screen 12 may also not include a non-display area, but may be configured to have a full-screen structure; and optical devices such as a distance sensor and an ambient light sensor may be disposed below the display screen or at other positions. Specifically, reference is made to FIG. 16, which is another structural diagram of a mobile terminal according to an embodiment of the present disclosure. The mobile terminal 40 includes a display screen 42, a cover 41, a circuit board 43, a battery 44, and a housing 45. The display screen 42 covers the housing 45 and has no non-display area. The cover plate 41 is configured to be adapted to the size of the display screen 42. It should be noted that: the housing 45 can be referred to the above housing 15; the circuit board 43 can be referred to the above circuit board 13; and the battery 44 can be referred to the above battery 14, which will not be described herein.

The terminal display assembly and the mobile terminal according to the embodiments of the present disclosure are described above in detail. Specific examples are employed in the present disclosure to illustrate the principles and embodiments of the present disclosure. The above description of the embodiments is simply made to facilitate understanding the present disclosure. Meanwhile, one skilled in the art may make any modifications to the specific embodiments and application scope based on the idea of the present disclosure. In sum, the contents set forth in the present description shall not be construed as limiting the present disclosure.

What is claimed is:

1. A terminal display assembly, comprising:
   a display screen defining a first through hole penetrating through the display screen in a thickness direction of the display screen;
   a first light-transmissive cover plate provided on and covering the display screen and defining a second through hole penetrating through the first light-transmissive cover plate in a thickness direction thereof, the second through hole having a size larger than that of the first through hole to form a supporting surface on the display screen, the supporting surface being a portion of the display screen exposed through the second through hole;
   a light-shielding member having a bottom wall and a side wall, the side wall and the bottom wall defining a receiving space, the side wall being adjacent to the first light-transmissive cover plate, the bottom wall being provided on the supporting surface and having a third through hole penetrating through the bottom wall in a thickness direction thereof, and the third through hole, the second through hole and the first through hole being in communication with each other; and
   a second light-transmissive cover plate provided within the receiving space to cover the first through hole and the third through hole, the side wall being located between the second light-transmissive cover plate and the first light-transmissive cover plate;
   wherein the bottom wall is provided between the display screen and the second light-transmissive cover plate.

2. The terminal display assembly according to claim 1, wherein the display screen and the first light-transmissive cover plate are bonded by an optically transparent adhesive layer, and the light-shielding member is at least partially bonded to the optically transparent adhesive layer.

3. The terminal display assembly according to claim 1, wherein the third through hole has a size smaller than or equal to that of the first through hole.

4. The terminal display assembly according to claim 1, wherein a surface of the first light-transmissive cover plate, a surface of the second light-transmissive cover plate, and a free end of the side wall are flush.

5. The terminal display assembly according to claim 1, wherein each of the first through hole, the second through hole and the third through hole is a circular through hole.

6. The terminal display assembly according to claim 1, wherein each of the first through hole, the second through hole and the third through hole is a rectangular through hole.

7. The terminal display assembly according to claim 1, wherein the light-shielding member is made of a metal material.

8. The terminal display assembly according to claim 1, wherein the light-shielding member is made of a stainless steel, aluminum alloy or magnesium alloy.

9. The terminal display assembly according to claim 1, wherein the light-shielding member is made of a light-shielding ink.

10. The terminal display assembly according to claim 9, wherein the light-shielding ink is formed on the second light-transmissive cover plate by means of printing.

11. The terminal display assembly according to claim 1, wherein the first through hole is adjacent to an edge of the display screen.

12. The terminal display assembly according to claim 1, wherein the first through hole, the second through hole and the third through hole have the same central axis.

13. The terminal display assembly according to claim 1, wherein the second light-transmissive cover plate has a projection extending from an inner surface thereof, and the projection is connected to the bottom wall.

14. The terminal display assembly according to claim 13, wherein a surface of the bottom wall is flush with a surface of the projection.

15. A mobile terminal, comprising:
a housing; and
a terminal display assembly provided within the housing;
wherein the terminal display assembly comprises:
   a display screen defining a first through hole penetrating through the display screen in a thickness direction of the display screen;
   a first light-transmissive cover plate provided on and covering the display screen and defining a second through hole penetrating through the first light-transmissive cover plate in a thickness direction thereof, the second through hole having a size larger than that of the first through hole to form a supporting surface on the display screen, the supporting surface being a portion of the display screen exposed through the second through hole;
   a light-shielding member having a bottom wall and a side wall, the side wall and the bottom wall defining a receiving space, the side wall being adjacent to the first light-transmissive cover plate, the bottom wall being provided on the supporting surface and having a third through hole penetrating through the bottom wall in a thickness direction thereof, and the third through hole, the second through hole and the first through hole being in communication with each other; and
   a second light-transmissive cover plate provided within the receiving space to cover the first through hole and the third through hole, the side wall being located between the second light-transmissive cover plate and the first light-transmissive cover plate;
   wherein the bottom wall is provided between the display screen and the second light-transmissive cover plate.

16. The mobile terminal according to claim 15, wherein the mobile terminal comprises an optical device provided at a position of the first through hole.

17. The mobile terminal according to claim 16, wherein the optical device comprises a camera module, the camera module comprising a lens provided within the first through hole.

18. The mobile terminal according to claim 15, wherein the terminal display assembly is a secondary terminal display assembly of the mobile terminal, and the mobile terminal comprises a primary terminal display assembly provided on the housing and having a larger display area than the secondary terminal display assembly, the primary terminal display assembly and the secondary terminal display assembly being respectively provided on opposite faces of the housing.

19. The mobile terminal according to claim 15, wherein the terminal display assembly is a primary terminal display assembly of the mobile terminal, and the mobile terminal comprises a secondary terminal display assembly provided on the housing, the primary terminal display assembly having a larger display area than the secondary terminal display assembly, the primary terminal display assembly and the secondary terminal display assembly being respectively disposed on opposite faces of the housing.

20. A mobile terminal, comprising:
a housing;
an optical device;
and a terminal display assembly provided within the housing;
wherein the terminal display assembly comprises:
   a display screen defining a first through hole penetrating through the display screen in a thickness direction of the display screen;
   a first light-transmissive cover plate provided on and covering the display screen and defining a second through hole penetrating through the first light-transmissive cover plate in a thickness direction thereof, the second through hole having a size larger than that of the first through hole to form a supporting surface on the display screen, the supporting surface being a portion of the display screen exposed through the second through hole;
   a light-shielding member having a bottom wall and a side wall, the side wall and the bottom wall defining a receiving space, the side wall being adjacent to the first light-transmissive cover plate, the bottom wall being provided on the supporting surface and having a third through hole penetrating through the bottom wall in a thickness direction thereof, and the third through hole, the second through hole and the first through hole being in communication with each other, wherein the bottom wall is provided between the display screen and the second light-transmissive cover plate; and
   a second light-transmissive cover plate provided within the receiving space to cover the first through hole and the third through hole, the side wall being located between the second light-transmissive cover plate and the first light-transmissive cover plate;
wherein the optical device includes a camera module, the camera module comprising a lens provided within the first through hole and the third through hole.

* * * * *